(12) United States Patent
Chou

(10) Patent No.: US 10,405,289 B2
(45) Date of Patent: Sep. 3, 2019

(54) DEVICE AND METHOD FOR HANDLING A MULTI-PANEL SYNCHRONIZATION SIGNAL BLOCK TRANSMISSION

(71) Applicant: HTC Corporation, Taoyuan (TW)

(72) Inventor: Kao-Peng Chou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/132,473

(22) Filed: Sep. 17, 2018

(65) Prior Publication Data

US 2019/0090212 A1 Mar. 21, 2019

Related U.S. Application Data

(60) Provisional application No. 62/559,653, filed on Sep. 18, 2017.

(51) Int. Cl.
| | |
|---|---|
| *H04W 56/00* | (2009.01) |
| *H04L 5/00* | (2006.01) |
| *H04L 27/26* | (2006.01) |
| *H04B 7/0408* | (2017.01) |

(Continued)

(52) U.S. Cl.
CPC ...... *H04W 56/0015* (2013.01); *H04B 7/0408* (2013.01); *H04L 5/0048* (2013.01); *H04L 27/2657* (2013.01); *H04W 48/08* (2013.01); *H04W 72/046* (2013.01); *H04L 27/2613* (2013.01); *H04L 27/2692* (2013.01)

(58) Field of Classification Search
CPC ........... H04W 56/0015; H04W 72/046; H04W 48/08; H04L 5/0048; H04L 27/2657; H04L 27/2613; H04L 27/2692; H04B 7/0408

See application file for complete search history.

(56) References Cited

U.S. PATENT DOCUMENTS

| | | | |
|---|---|---|---|
| 2016/0164588 A1* | 6/2016 | Chen | H04B 7/0469 375/267 |
| 2016/0204921 A1* | 7/2016 | Kim | H04L 12/189 370/312 |

(Continued)

OTHER PUBLICATIONS

3GPP TSG-RAN WG1 #89, R1-1708666, Hangzhou, China, May 15-19, 2017.

(Continued)

*Primary Examiner* — Vineeta S Panwalkar

(74) *Attorney, Agent, or Firm* — Winston Hsu

(57) ABSTRACT

A method of handling a multi-panel SS block transmission comprises the instructions of the BS transmitting a configuration set to the communication device, wherein the configuration set comprises a plurality of panel configurations; the BS configuring a primary panel with a primary SS block time index set and a primary time index order according to a first panel configuration; the BS configuring at least one secondary panel with at least one secondary SS block time index set and at least one secondary time index order according to at least one second panel configuration; the BS configuring the primary panel with a first association between a first beam index and a primary SS block time index; and the BS configuring the at least one secondary panel with at least one second association between at least one second beam index and at least one secondary SS block time index.

10 Claims, 7 Drawing Sheets

(51) Int. Cl.
*H04W 72/04* (2009.01)
*H04W 48/08* (2009.01)

(56) References Cited

U.S. PATENT DOCUMENTS

2018/0287759 A1* 10/2018 Kundargi .............. H04L 5/0051
2018/0309526 A1* 10/2018 Zhang ................. H04B 7/0617

OTHER PUBLICATIONS

Final Report of 3GPP TSG RAN WG1 #89 v1.0.0 (Hangzhou, China, dated May 15-19, 2017).
Final Report of 3GPP TSG RAN WG1 #AH_NR2 v1.0.0, Qingdao, China, dated Jun. 27-30, 2017.

* cited by examiner

DEVICE AND METHOD FOR HANDLING A MULTI-PANEL SYNCHRONIZATION SIGNAL BLOCK TRANSMISSION

CROSS REFERENCE TO RELATED APPLICATIONS

This application claims the benefit of U.S. Provisional Applications No. 62/559,653 filed on Sep. 18, 2017, which is incorporated herein by reference.

BACKGROUND OF THE INVENTION

1. Field of the Invention

The present invention relates to a device and a method used in a wireless communication system, and more particularly, to a device and a method of handling a multi-panel synchronization signal (SS) block transmission in a wireless communication system.

2. Description of the Prior Art

The new radio (NR) supports a wide range of carrier frequencies from hundreds of MHz to dozens of GHz. In the NR, in order to overcome severe attenuation nature of high-frequency radio, a beamforming technique with massive antenna arrays is introduced. However, a base station (BS) has to sweep beam directions within a cell for system information broadcasting and beam management. The user equipment (UE) may need to monitor the beam directions and power in a sweeping period, which causes high power consumption.

SUMMARY OF THE INVENTION

The present invention therefore provides a communication device for handling a multi-panel synchronization signal (SS) block transmission to solve the abovementioned problem.

A base station (BS) with a plurality of panels and a communication device for handling a multi-panel SS block transmission comprises at least one storage device for storing instructions and at least one processing circuit coupled to the at least one storage device. The at least one processing circuit is configured to execute the instructions stored in the at least one storage device. The instructions comprise the BS transmitting a configuration set to the communication device, wherein the configuration set comprises a plurality of panel configurations corresponding to the plurality of panels; the BS configuring a primary panel of the plurality of panels with a primary SS block time index set and a primary time index order according to a first panel configuration of the plurality of panel configurations; the BS configuring at least one secondary panel of the plurality of panels with at least one secondary SS block time index set and at least one secondary time index order according to at least one second panel configuration of the plurality of panel configurations; the BS configuring the primary panel with a first association between a first beam index and a primary SS block time index of the primary SS block time index set; and the BS configuring the at least one secondary panel with at least one second association between at least one second beam index and at least one secondary SS block time index of the at least one secondary SS block time index set; wherein the primary panel transmits at least one first SS block according to the first panel configuration, and the at least one secondary panel transmits at least one second SS block according to the at least one second panel configuration.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
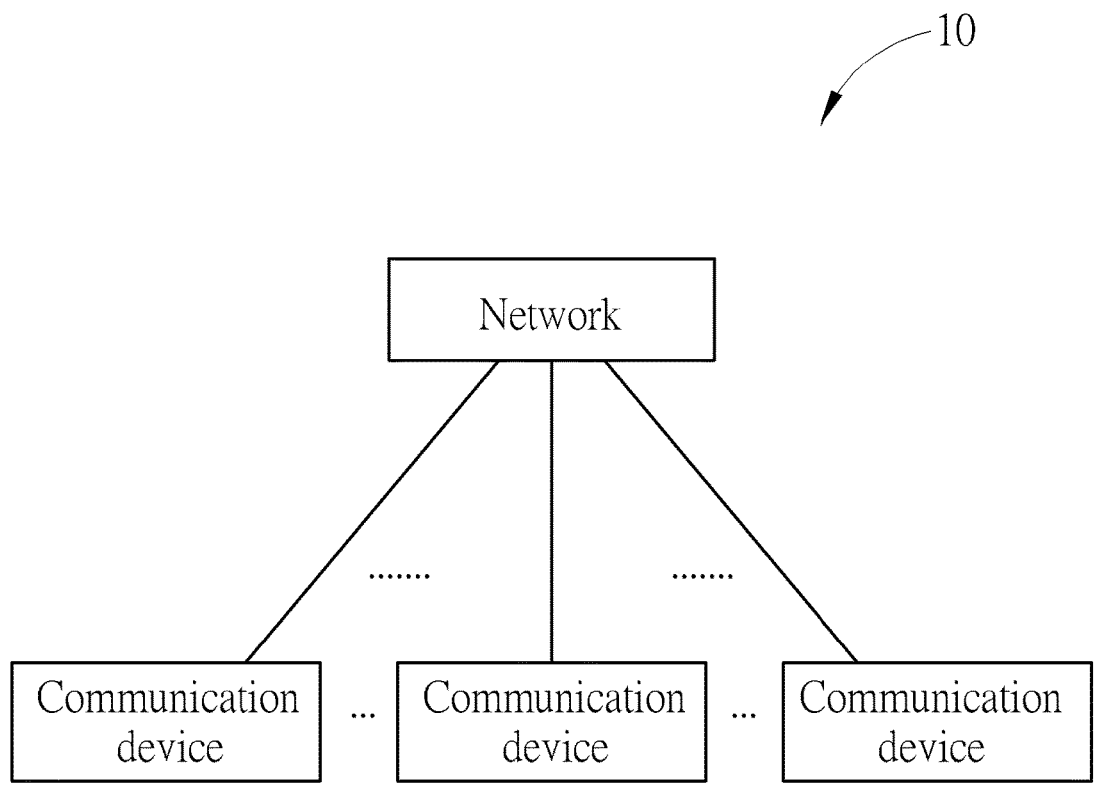
FIG. 1 is a schematic diagram of a wireless communication system according to an example of the present invention.

In FIG. 1, a network and communication devices are simply utilized for illustrating the structure of a wireless communication system 10. Practically, the network includes at least one of a long-term evolution (LTE) network, an evolved LTE network, a new radio (NR) network and a sixth generation (6G) network. The 6G radio communication technology may employ orthogonal frequency-division multiplexing (OFDM) or non-OFDM, a wider bandwidth (e.g., 1 GHz, 2 GHz or 5 GHz) and a transmission time interval (TTI) shorter than 1 ms (e.g., 1, 2, 3 or 4 OFDM symbols, 100, or 200 us) for communications between the communication devices and the 6G BS.

A communication device may be a user equipment (UE), a mobile phone, a laptop, a tablet computer, an electronic book, a portable computer system, a vehicle, or an aircraft. In addition, the network and the communication device can be seen as a transmitter or a receiver according to direction of transmission (i.e., transmission direction), e.g., for an uplink (UL), the communication device is the transmitter and the network is the receiver, and for a downlink (DL), the network is the transmitter and the communication device is the receiver.

Figure 2:
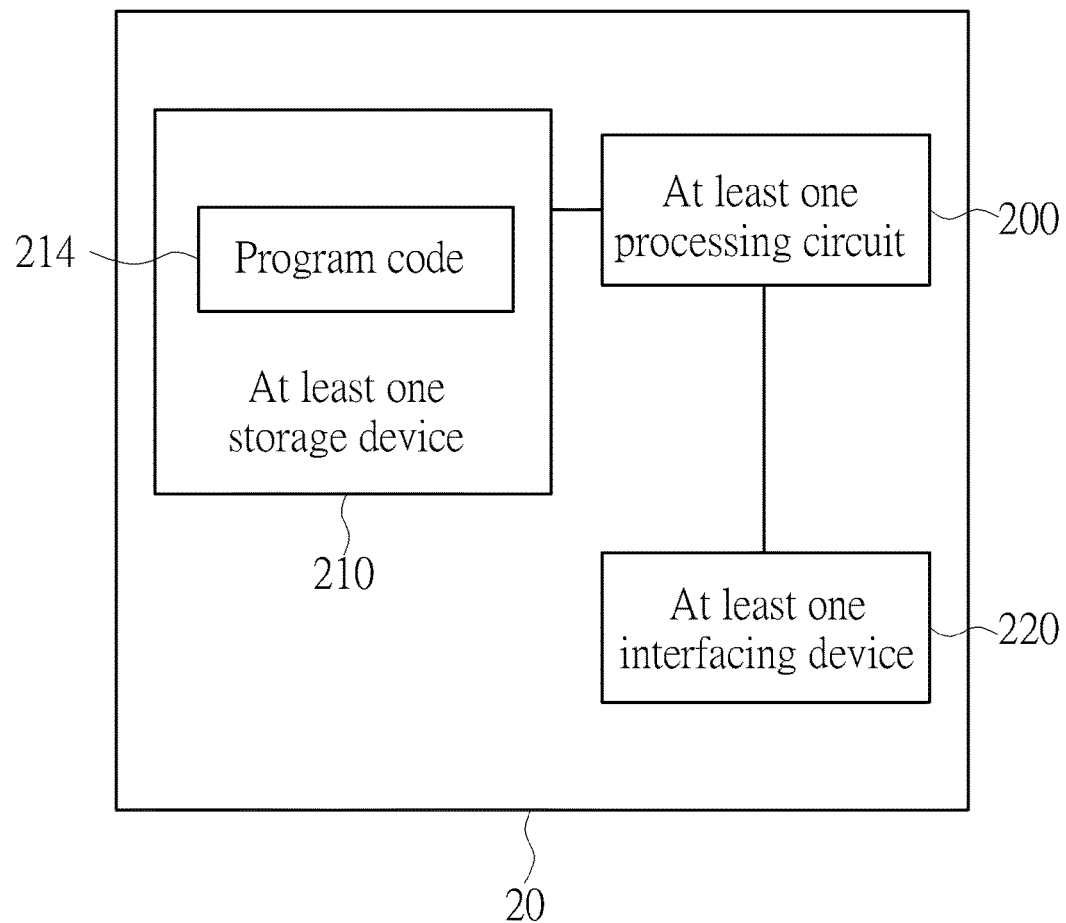
FIG. 2 is a schematic diagram of a communication device according to an example of the present invention.

In FIG. 2, a communication device 20 may be a communication device or the network shown in FIG. 1, but is not limited herein. The communication device 20 may include at least one processing circuit 200 of which each may be a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver used to transmit and receive signals (e.g., data, messages and/or packets) according to processing results of the at least one processing circuit 200.

A beamforming technology has been introduced for a UE specific transmission in a LTE system. A basic beamforming is achieved by a linear phased waveform transmitted by an antenna array. A transceiver adopts a digital beamforming architecture that a device can change a signal phase of a signal in a baseband, and feed the signal to a radio frequency (RF) chain. However, multiple RF chains increase cost of hardware implementation. In NR, the number of antennas is dozens of times of that in LTE. A pure digital beamforming architecture may lead to an unacceptable hardware implementation cost. As an alternative, an analog beamforming can integrate massive antennas in the device with lower cost. In an analog beamforming architecture, a RF-based phase shifter, which is a less cost circuit compared with a baseband signal processing, is used. As a tradeoff of lowering the cost, the device with the analog beamforming can only transmit signals in one beam direction at an instant. In addition, beside the digital beamforming and the analog beamforming, there is a combined architecture called a hybrid beamforming. The Hybrid beamforming includes both the baseband phase processing and the RF band phase shifter, which can be a compromised solution for a multi-panel transmission.

A multi-panel concept in the NR indicates an ability of a device to transmit multiple beams in multiple directions simultaneously. A method for achieving the multi-panel concept is conjunction multiple panel antennas for a BS, which causes a beam direction set of each panel not identical if the panel antennas are not co-located. Another method for achieving the multi-panel concept is a digital or hybrid beamforming based transceiver including multiple RF chains, which is introduced in the LTE for a UE-specific data transmission referred to as a multiple user multi-input-multi-output (MIMO) (MU-MIMO) technology. The NR supports a MIMO transmission, which indicates built-in multiple RF chains of the transceiver. Whether the built-in RF chains in the MIMO technology or the beamforming are used or not is based on a system design.

A concept of the synchronization signal (SS) block is introduced for a multi-panel transmission. Each SS block may (e.g., only) be transmitted in one beam direction. The SS block is composed of a Primary SS (PSS), a Secondary SS (SSS) and/or a Physical Broadcast Channel (PBCH). In the LTE, the PSS, SSS and PBCH are regarded as individual signals. In the NR, the PSS, the SSS and the PBCH which are consecutively transmitted are regarded as a SS block. A NR BS (or called gNB) transmits a burst of SS blocks in a time period. As a result, locations of the SS blocks are no longer fixed in a radio frame. Each of the SS blocks is configured with a SS block time index. A UE can calibrate frame timing by identifying the SS block time index within the time period for the transmission of the burst of SS blocks.

In the following examples, a UE is used for representing a communication device in FIG. 1, to simplify the illustration of the embodiments.

Figure 3:
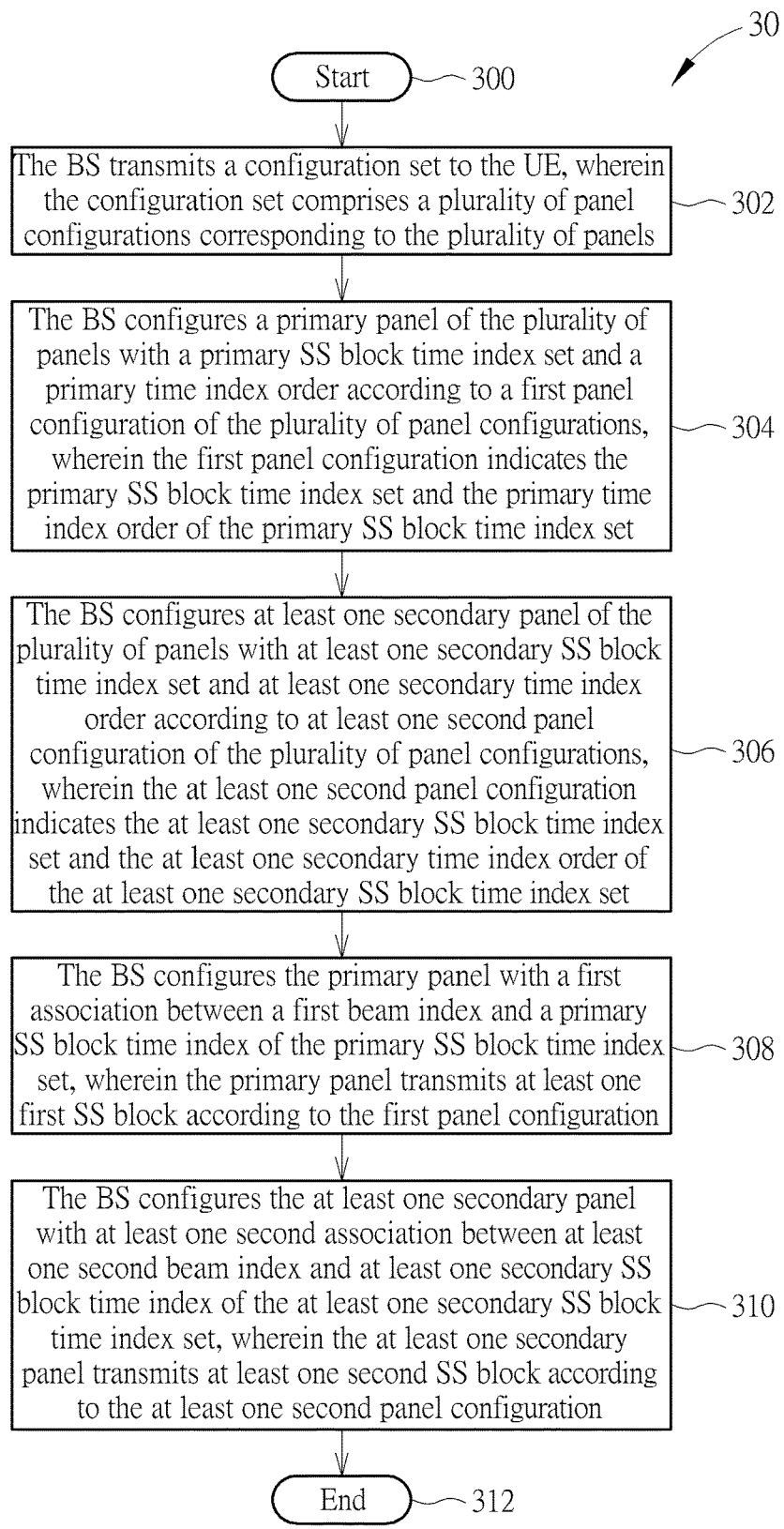
FIG. 3 is a flowchart of a process according to an example of the present invention.

FIG. 3 is a flowchart of a process 30 according to an example of the present invention. The process 30 can be utilized in a BS with a plurality of panels and a UE, for handling a multi-panel SS block transmission. The process 30 includes the following steps:

Step 300: Start.

Step 302: The BS transmits a configuration set to the UE, wherein the configuration set comprises a plurality of panel configurations corresponding to the plurality of panels.

Step 304: The BS configures a primary panel of the plurality of panels with a primary SS block time index set and a primary time index order according to a first panel configuration of the plurality of panel configurations, wherein the first panel configuration indicates the primary SS block time index set and the primary time index order of the primary SS block time index set.

Step 306: The BS configures at least one secondary panel of the plurality of panels with at least one secondary SS block time index set and at least one secondary time index order according to at least one second panel configuration of the plurality of panel configurations, wherein the at least one second panel configuration indicates the at least one secondary SS block time index set and the at least one secondary time index order of the at least one secondary SS block time index set.

Step 308: The BS configures the primary panel with a first association between a first beam index and a primary SS block time index of the primary SS block time index set, wherein the primary panel transmits at least one first SS block according to the first panel configuration.

Step 310: The BS configures the at least one secondary panel with at least one second association between at least one second beam index and at least one secondary SS block time index of the at least one secondary SS block time index set, wherein the at least one secondary panel transmits at least one second SS block according to the at least one second panel configuration.

Step 312: End.

According to the process 30, the BS transmits (or broadcasts) a configuration set including a plurality of panel configurations corresponding to the plurality of panels, to the UE. The BS configures the primary panel with the primary SS block time index set and the primary time index order within the primary SS block time index set according to the first panel configuration, and configures the at least one secondary panel with the at least one secondary SS block time index set and the at least one secondary time index order within the at least one secondary SS block time index set according to the second panel configuration. The primary panel and the at least one secondary panel transmit the SS blocks according to the first configuration and the at least one second configuration, respectively. Thus, the beam sweeping period is shortened, and the risk of bad channel condition is reduced.

Realization of the process 30 is not limited to the above description. The following examples may be applied to the process 30.

In one example, the primary SS block time index is associated with the first beam index, and each secondary SS block time index of the at least one secondary SS block time index is associated with each second beam index of the at least one second beam index. In one example, the first beam index is associated with at least one first SS block time index, and each second beam index of the at least one second beam index is associated with at least one second SS block time index. That is, a SS block time index is associated with only one beam index. A single beam index is associated with one or multiple SS block indices. In one example, the beams transmitted at the same time by different panels which are selected by the BS, are low mutual interfered.

Figure 4:
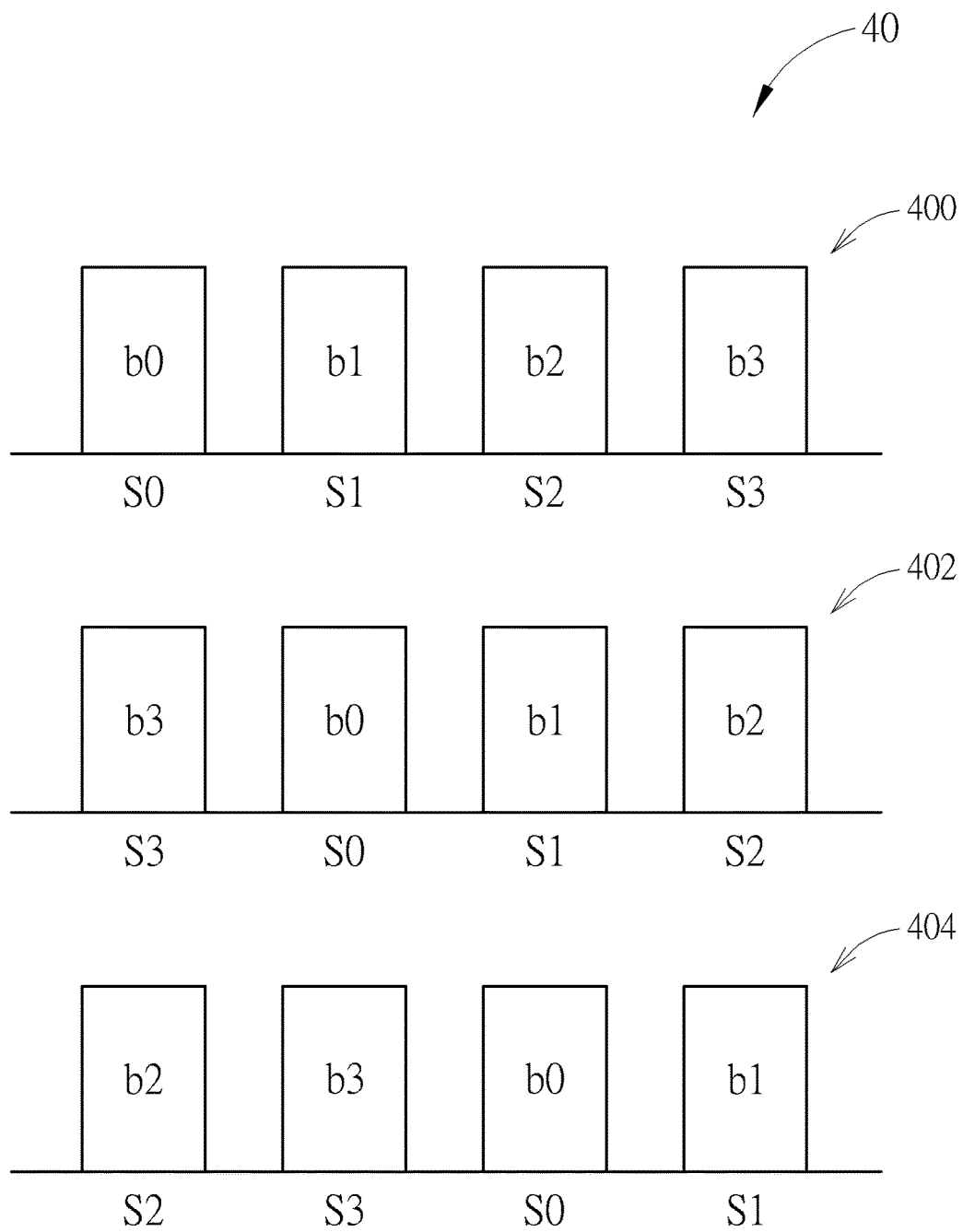
FIG. 4 is a schematic diagram of a panel configuration according to an example of the present invention.

FIG. 4 is a schematic diagram of a panel configuration 40 according to an example of the present invention. There are three panels 400, 402 and 404, wherein the panel 400 is a primary panel and the panels 402 and 404 are secondary panels. There are four beam direction indices b0, b1, b2 and b3. Each beam direction index indicates a beam direction. There are four SS block time indices S0, S1, S2 and S3. The panel 400 transmits SS blocks with the SS block time indices in an order of S0, S1, S2 and S3. The SS blocks with the SS block time indices S0, S1, S2 and S3 are transmitted in beam directions with the beam direction indices b0, b1, b2 and b3, respectively (i.e., the association between the SS block time indices and the beam direction indices is {b0-S0, b1-S1, b2-S2, b3-S3}). The panel 402 transmits the SS blocks with the SS block time indices in an order of S3, S0, S1 and S2. The SS blocks with the SS block time indices S3, S0, S1 and S2 are transmitted in beam directions with the beam direction indices b3, b0, b1 and b2, respectively. The panel 404 transmits the SS blocks with the SS block time indices in an order of S2, S3, S0 and S1. The SS blocks with the SS block time indices S2, S3, S0 and S1 are transmitted in beam directions with the beam direction indices b2, b3, b0 and b1, respectively. That is, the panels 402 and 404 (i.e., the secondary panels) transmit the same SS blocks by using the same SS block time index set as the panel 400 (i.e., the primary panel), namely {S0, S1, S2, S3}, but with different orders (i.e., S3-S0-S1-S2 and S2-S3-S0-S1) from that of the panel 400 (i.e., S0-S1-S2-S3).

Figure 5:
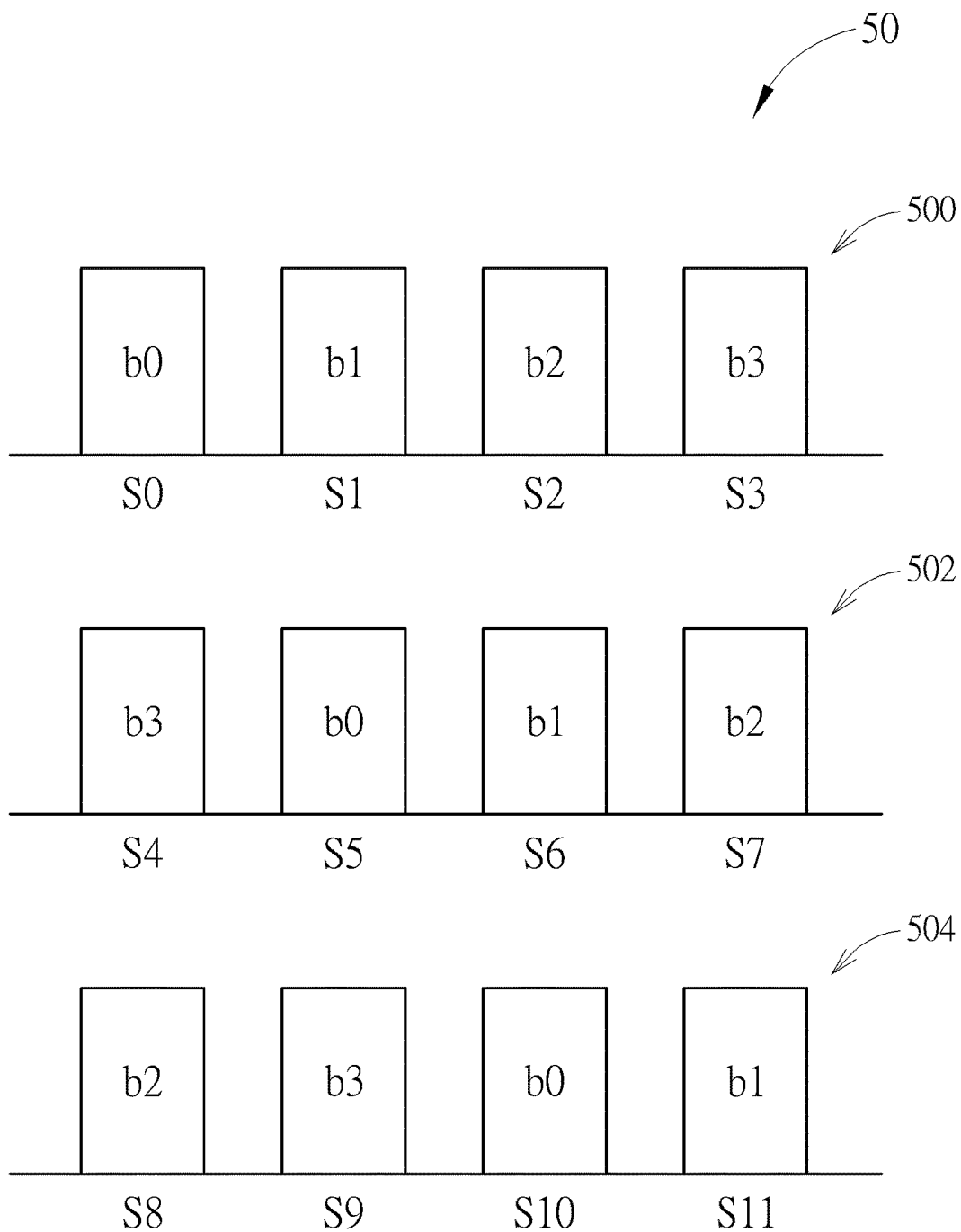
FIG. 5 is a schematic diagram of a panel configuration according to an example of the present invention.

FIG. 5 is a schematic diagram of a panel configuration 50 according to an example of the present invention. There are three panels 500, 502 and 504, wherein the panel 500 is a primary panel and the panels 502 and 504 are secondary panels. There are four beam direction indices b0, b1, b2 and b3. Each beam direction index indicates a beam direction. There are twelve SS block time indices S0, S1, S2, . . . , S10 and S11. The panel 500 transmits the SS blocks with the SS block time indices in an order of S0, S1, S2 and S3. The SS blocks with the SS block time indices S0, S1, S2 and S3 are transmitted in beam directions with the beam direction indices b0, b1, b2 and b3, respectively (i.e., the association between the SS block time indices and the beam direction indices is {b0-S0, b1-S1, b2-S2, b3-S3}). The panel 502 transmits the SS blocks with the SS block time indices in an order of S4, S5, S6 and S7. The SS blocks with the SS block time indices S4, S5, S6 and S7 are transmitted in beam directions with the beam direction indices b3, b0, b1 and b2, respectively (i.e., the association between the SS block time indices and the beam direction indices is {b3-S4, b0-S5, b1-S6, b2-S7}). The panel 504 transmits the SS blocks with the SS block time indices in an order of S8, S9, S10 and S11. The SS blocks with the SS block time indices S8, S9, S10 and S11 are transmitted in beam directions with the beam direction indices b2, b3, b0 and b1 (i.e., the association between the SS block time indices and the beam direction indices is {b2-S8, b3-S9, b0-S10, b1-S11}). That is, the panels 502 and 504 (i.e., the secondary panels) transmit the same SS blocks by using different SS block time index set and different orders from the panel 500 (i.e., the primary panel).

The UE detects multiple SS blocks with different SS block time indices in a same time-frequency resource. The UE may detect repetitive SS block indices at a different time instant or may miss detecting the SS blocks of a primary SS block index set, which cause the UE erroneously calculating a frame boundary. Thus, the UE may need to find a correct frame timing and to calibrate the correct frame timing.

Figure 6:
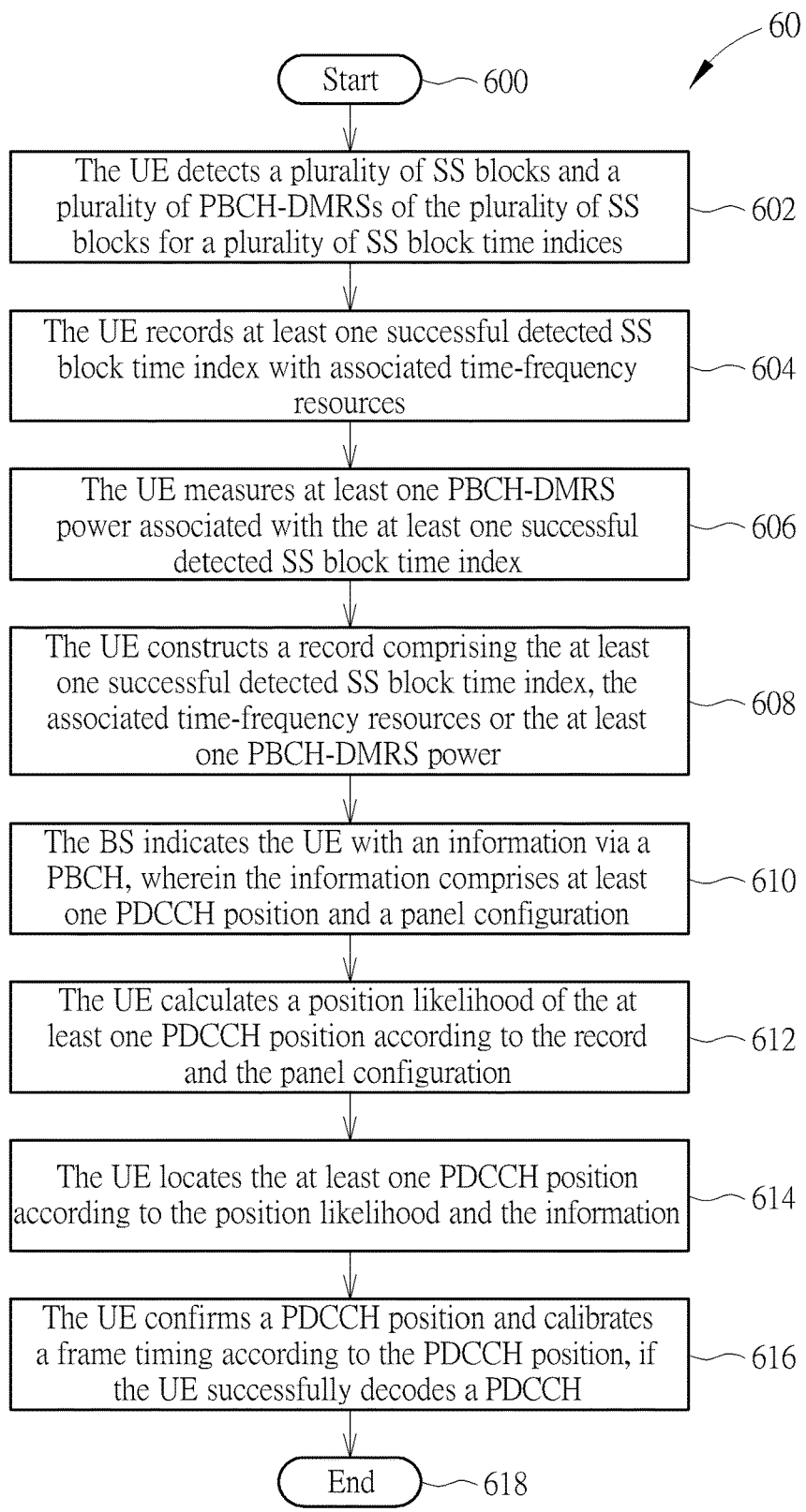
FIG. 6 is a flowchart of a process according to an example of the present invention.

FIG. 6 is a flowchart of a process 60 according to an example of the present invention. The process 60 can be utilized in a BS with a plurality of panels and a UE, for handling a multi-panel SS block transmission. The process 60 includes the following steps:

Step 600: Start.

Step 602: The UE detects a plurality of SS blocks and a plurality of physical broadcast channel demodulation reference signals (PBCH-DMRSs) of the plurality of SS blocks for a plurality of SS block time indices.

Step 604: The UE records at least one successful detected SS block time index with associated time-frequency resources.

Step 606: The UE measures at least one PBCH-DMRS power associated with the at least one successful detected SS block time index.

Step 608: The UE constructs a record comprising the at least one successful detected SS block time index, the associated time-frequency resources or the at least one PBCH-DMRS power.

Step 610: The BS indicates the UE with an information via a PBCH, wherein the information comprises at least one physical downlink (DL) control channel (PDCCH) position and a panel configuration.

Step 612: The UE calculates a position likelihood of the at least one PDCCH position according to the record and the panel configuration.

Step 614: The UE locates the at least one PDCCH position according to the position likelihood and the information.

Step 616: The UE confirms a PDCCH position and calibrates a frame timing according to the PDCCH position, if the UE successfully decodes a PDCCH.

Step 618: End.

According to the process 60, the UE constructs a record of the successful detected SS block time indices, the PBCH-DMRS power associated with the successful detected SS block time indices and the associated time-frequency resources. The UE calculates the position likelihood of the at least one PDCCH position according to the record and the panel configuration. The UE calibrates the frame timing according to the position likelihood. Thus, the UE can calibrate the frame boundary of the multiple-panel SS transmission.

Figure 7:
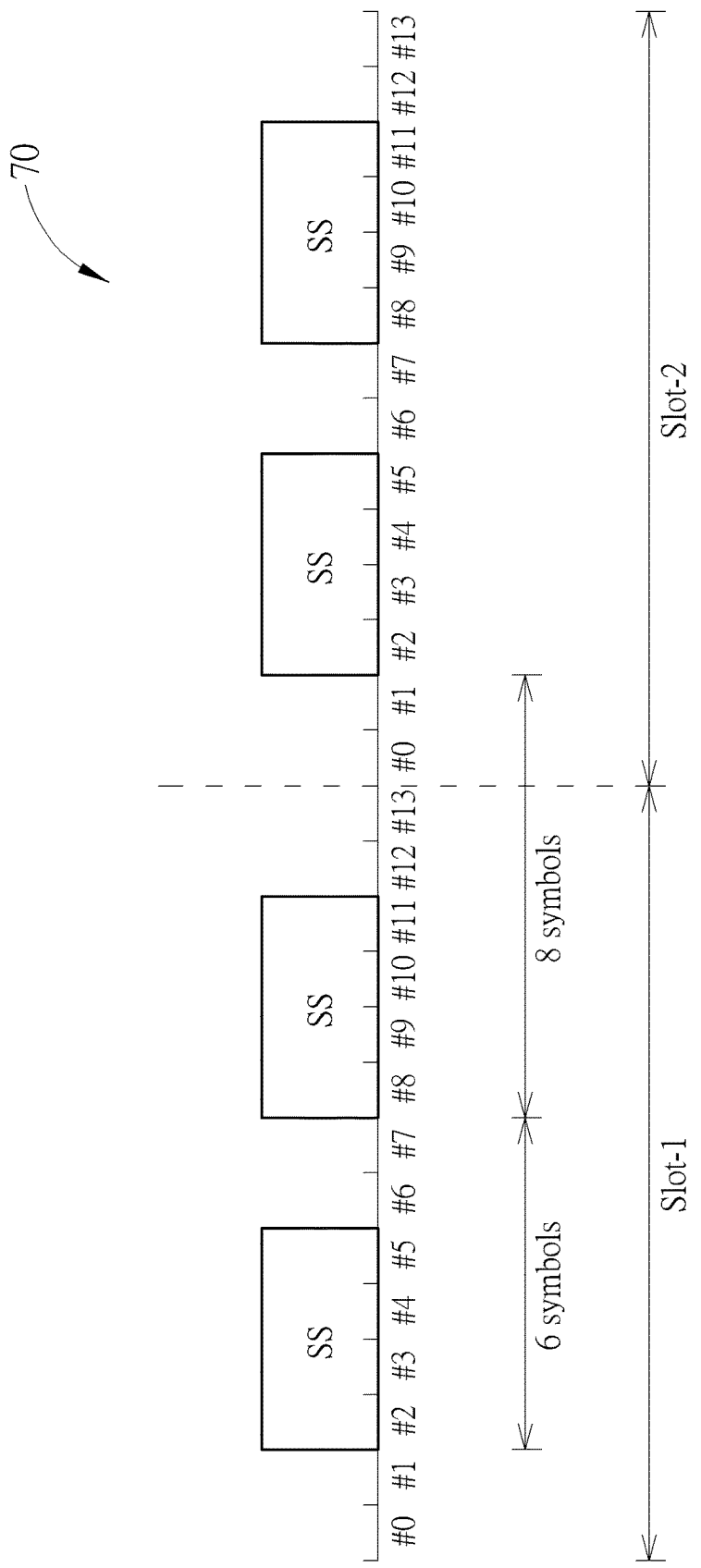
FIG. 7 is a schematic diagram of a timeline according to an example of the present invention.

FIG. 7 is a schematic diagram of a timeline 70 according to an example of the present invention. There are two 14-symbol (i.e., #0, #1, . . . , #13) slots Slot-1 and Slot-2 on the timeline 70. Each slot includes two SS blocks starting at symbols #2 and #8. Each SS block occupies (or includes) 4 symbols in an order of PSS-PBCH-SSS-PBCH. A time offset of 2 consecutive SS blocks started at symbols #2 and #8 within a slot is 6 symbols. A time offset of 2 consecutive SS blocks started at symbols #8 and #2 crossing a slot is 8 symbols. The BS transmits SS blocks according to the process 30 and the panel configuration described in FIG. 4. In the symbol #2 of the slot Slot-1, the SS block time indices are {S0, S3, S2}. In the symbol #8 of the slot Slot-1, the SS block time indices are {S1, S0, S3}. In the symbol #2 of the slot Slot-2, the SS block time indices are {S2, S1, S0}. In the symbol #8 of the slot Slot-2, the SS block time indices are {S3, S2, S1}. Examples of several cases are described as follows.

Case 1: The UE detects 3 SS blocks with the SS block time index S1. The UE constructs a record that on the symbols #0, #6 and #14 (e.g., the reference time), the SS blocks with the SS block time index S1 are detected. The UE obtains a panel configuration by decoding a PBCH of one of the detected SS blocks. The UE calculates a position likelihood by comparing the record with the panel configuration, and determines that the SS blocks with the SS block time index S1 are detected on the symbol #8 of the slot Slot-1, the symbol #2 of the slot Slot-2 and the symbol #8 of the slot Slot-2.

Case 2: The UE detects 2 SS blocks with the SS block time index S1 and 2 SS blocks with the SS block time index S3. The UE constructs a record that on the symbols #0 and #8 (e.g., the reference time), the SS blocks with the SS block time index S1 and S3 are detected. The UE obtains a panel configuration by decoding a PBCH of one of the detected SS blocks. The UE calculates a position likelihood by comparing the record with the panel configuration, and determines the that the SS blocks with the SS block time index S1 and S3 are detected on the symbol #8 of the slot Slot-1, and the SS block with the SS block time index S1 is detected on the symbol #2 of the slot Slot-2. The result shows that the SS block with the SS block time index S3 received at the symbol #8 may be a miss detection.

Case 3: The UE detects 2 SS blocks with the SS block time index S0 and with power levels P0 and P2, respectively. The UE also detects 2 SS blocks with SS block time index S2 and with power levels P1 and P3, respectively. The UE constructs a record that on the symbol #0 (e.g., the reference time), the SS block with the SS block index S0 and the power level P0 and the SS block with the SS block index S2 and the power level P1 are detected, and on the symbol #6 (e.g., the reference time), the SS block with the SS block index S0 and the power level P2 and the SS block with the SS block index S2 and the power level P3 are detected. The UE obtains a panel configuration by decoding a PBCH of one of the detected SS blocks. The UE calculates a position likelihood by comparing the record with the panel configuration. If the power level (P0+P2) is greater than the power level (P1+P3), the UE determines that the SS block with the SS block time index S0 and the power level P0 and the SS block with the SS block time index S2 and the power level P1 are detected on the symbol #2 of the slot Slot-1, and the SS block with the SS block time index S0 and the power level P2 is detected on the symbol #8 of the slot Slot-1. If the UE erroneously decodes a PDCCH according to the above frame timing, the UE calibrates the timing to that the SS block with the SS block time index S0 and the power level P0 and the SS block with the SS block time index S2 and the power level P1 are detected on the symbol #2 of the slot Slot-2, and the SS block with the SS block time index S2 and the power level P3 is detected on the symbol #8 of the slot Slot-2.

Case 4: For the panel configuration 50 described in FIG. 5, a PBCH content carries associations between the SS block time indices and the panels (e.g., S0=S5=S10, S1=S6=S11, S2=S7=S8 and S3=S4=S9). The following steps are similar to the cases using the panel configuration 40 described in FIG. 4, and are not narrated herein.

In one example, the BS configures the UE with a measurement period, a multi-panel indicator or a panel configuration via a PBCH or a DL control information (DCI). The UE detects a plurality of SS blocks in a time-frequency resource in the measurement period. The UE determines a plurality of PBCH-DMRS detection candidates according to the multi-panel indicator or the panel configuration. The UE measures a plurality of reference signal received powers (RSRPs) of the PBCH-DMRS detection candidates. The UE reports the plurality of RSRPs associated with the primary SS block time index set, to the BS.

Take the mapping of the consecutive SS blocks described in FIG. 7 as an example of the beam measuring period. A BS transmits multi-panel SS blocks according to the process 30 and applies the panel configuration 40 described in FIG. 4. Examples of two cases are described as follows.

Case 1: In the case of a single panel, a frame timing is calibrated. The BS indicates the UE to detect and measure the SS blocks with the SS block time index S0 at the symbol #2 of the slot Slot-1, the SS block time index S1 at the symbol #8 of the slot Slot-1, the SS block time index S2 at the symbol #2 of the slot Slot-2 and the SS block time index S3 at the symbol #8 of the slot Slot-2. In the measurement period, the UE obtains the RSRP information {P0, P1, P2, P3} of the SS blocks with full beam direction indices {b0, b1, b2, b3} in two slots. The UE reports to the BS that associations between the SS block time index and the measured RSRPs are {S0-P0, S1-P1, S2-P2, S3-P3}.

Case 2: In the case of 3 panels, a frame timing is calibrated. The BS indicates the UE to detect and measure the SS blocks with the SS block time indices S0, S3, S2 at the symbol #2 of the slot Slot-1, and to detect and measure the SS blocks with the SS block time indices S1, S0, S3 at the symbol #8 of the slot Slot-1. In the measurement period, the UE obtains the RSRP information {P0', P1, P2, P3'} of the SS blocks with full beam direction indices {b0, b1, b2, b3} in one slot. The UE reports to the BS that associations between the SS block time indices and the measured RSRPs are {S0-P0, S1-P1, S2-P2, S3-P3} or {S0-(P0+P0')/2, S1-P1, S2-P2, S3-(P3+P3')/2}. If a channel condition is bad, the BS configures the UE to measure both the slots Slot-1 and Slot-2 for time diversity.

Case 3: For the panel configuration 50 described in FIG. 5, the PBCH content carries the associations between the SS block time indices and the panels (e.g., S0=S5=S10, S1=S6=S11, S2=S7=S8 and S3=S4=S9). The following steps are similar to the cases using the panel configuration 40 described in FIG. 4, and are not narrated herein.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides methods and devices for handling a multi-panel SS block transmission. The beam sweeping period is shortened by utilizing multiple panels with certain SS transmission design. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A base station (BS) with a plurality of panels and a communication device for handling a multi-panel synchronization signal (SS) block transmission, comprising:
   at least one storage device; and
   at least one processing circuit, coupled to the at least one storage device, wherein the at least one storage device store, and the at least one processing circuit is configured to execute instructions of:

the BS transmitting a configuration set to the communication device, wherein the configuration set comprises a plurality of panel configurations corresponding to the plurality of panels;

the BS configuring a primary panel of the plurality of panels with a primary SS block time index set and a primary time index order according to a first panel configuration of the plurality of panel configurations, wherein the first panel configuration indicates the primary SS block time index set and the primary time index order of the primary SS block time index set;

the BS configuring at least one secondary panel of the plurality of panels with at least one secondary SS block time index set and at least one secondary time index order according to at least one second panel configuration of the plurality of panel configurations, wherein the at least one second panel configuration indicates the at least one secondary SS block time index set and the at least one secondary time index order of the at least one secondary SS block time index set;

the BS configuring the primary panel with a first association between a first beam index and a primary SS block time index of the primary SS block time index set; and the BS configuring the at least one secondary panel with at least one second association between at least one second beam index and at least one secondary SS block time index of the at least one secondary SS block time index set;

wherein the primary panel transmits at least one first SS block according to the first panel configuration, and the at least one secondary panel transmits at least one second SS block according to the at least one second panel configuration.

2. The BS and the communication device of claim 1, wherein the primary SS block time index is associated with the first beam index, and each secondary SS block time index of the at least one secondary SS block time index is associated with each second beam index of the at least one second beam index.

3. The BS and the communication device of claim 1, wherein the first beam index is associated with at least one first SS block time index, and each second beam index of the at least one second beam index is associated with at least one second SS block time index.

4. The BS and the communication device of claim 1, wherein the instructions further comprise:

the communication device detecting a plurality of SS blocks and a plurality of physical broadcast channel demodulation reference signals (PBCH-DMRSs) of the plurality of SS blocks for a plurality of SS block time indices;

the communication device recording at least one successful detected SS block time index with associated time-frequency resources;

the communication device measuring at least one PBCH-DMRS power associated with the at least one successful detected SS block time index;

the communication device constructing a record comprising the at least one successful detected SS block time index, the associated time-frequency resources or the at least one PBCH-DMRS power;

the BS indicating the communication device with an information via a PBCH, wherein the information comprises at least one physical downlink (DL) control channel (PDCCH) position and a panel configuration;

the communication device calculating a position likelihood of the at least one PDCCH position according to the record and the panel configuration;

the communication device locating the at least one PDCCH position according to the position likelihood and the information; and the communication device confirming a PDCCH position and calibrating a frame timing according to the PDCCH position, if the communication device successfully decodes a PDCCH.

5. The BS and the communication device of claim 1, wherein the instructions further comprise:

the BS configuring the communication device with a measurement period, a multi-panel indicator or a panel configuration via a PBCH or a DL control information (DCI);

the communication device detecting a plurality of SS blocks from a time-frequency resource in the measurement period;

the communication device determining a plurality of PBCH-DMRS detection candidates according to the multi-panel indicator or the panel configuration;

the communication device measuring a plurality of reference signal received powers (RSRPs) of the PBCH-DMRS detection candidates; and the communication device reporting the plurality of RSRPs associated with the primary SS block time index set, to the BS.

6. A method of handling a multi-panel synchronization signal (SS) block transmission for a base station (BS) with a plurality of panels and a communication device of a wireless communication system, the method comprising:

the BS transmitting a configuration set to the communication device, wherein the configuration set comprises a plurality of panel configurations corresponding to the plurality of panels;

the BS configuring a primary panel of the plurality of panels with a primary SS block time index set and a primary time index order according to a first panel configuration of the plurality of panel configurations, wherein the first panel configuration indicates the primary SS block time index set and the primary time index order of the primary SS block time index set;

the BS configuring at least one secondary panel of the plurality of panels with at least one secondary SS block time index set and at least one secondary time index order according to at least one second panel configuration of the plurality of panel configurations, wherein the at least one second panel configuration indicates the at least one secondary SS block time index set and the at least one secondary time index order of the at least one secondary SS block time index set;

the BS configuring the primary panel with a first association between a first beam index and a primary SS block time index of the primary SS block time index set; and the BS configuring the at least one secondary panel with at least one second association between at least one second beam index and at least one secondary SS block time index of the at least one secondary SS block time index set;

wherein the primary panel transmits at least one first SS block according to the first panel configuration, and the at least one secondary panel transmits at least one second SS block according to the at least one second panel configuration.

7. The method of claim 6, wherein the primary SS block time index is associated with the first beam index, and each secondary SS block time index of the at least one secondary SS block time index is associated with each second beam index of the at least one second beam index.

8. The method of claim 6, wherein the first beam index is associated with at least one first SS block time index, and each second beam index of the at least one second beam index is associated with at least one second SS block time index.

9. The method of claim 6, wherein the method further comprises:
- the communication device detecting a plurality of SS blocks and a plurality of physical broadcast channel demodulation reference signals (PBCH-DMRSs) of the plurality of SS blocks for a plurality of SS block time indices;
- the communication device recording at least one successful detected SS block time index with associated time-frequency resources;
- the communication device measuring at least one PBCH-DMRS power associated with the at least one successful detected SS block time index;
- the communication device constructing a record comprising the at least one successful detected SS block time index, the associated time-frequency resources or the at least one PBCH-DMRS power;
- the BS indicating the communication device with an information via a PBCH, wherein the information comprises at least one physical downlink (DL) control channel (PDCCH) position and a panel configuration;
- the communication device calculating a position likelihood of the at least one PDCCH position according to the record and the panel configuration;
- the communication device locating the at least one PDCCH position according to the position likelihood and the information; and
- the communication device confirming a PDCCH position and calibrating a frame timing according to the PDCCH position, if the communication device successfully decodes a PDCCH.

10. The method of claim 6, wherein the method further comprises:
- the BS configuring the communication device with a measurement period, a multi-panel indicator or a panel configuration via a PBCH or a DL control information (DCI);
- the communication device detecting a plurality of SS blocks from a time-frequency resource in the measurement period;
- the communication device determining a plurality of PBCH-DMRS detection candidates according to the multi-panel indicator or the panel configuration;
- the communication device measuring a plurality of reference signal received powers (RSRPs) of the PBCH-DMRS detection candidates; and
- the communication device reporting the plurality of RSRPs associated with the primary SS block time index set, to the BS.

* * * * *